Sept. 2, 1930. J. L. PRICE 1,774,565
BRAKE
Filed March 3, 1926
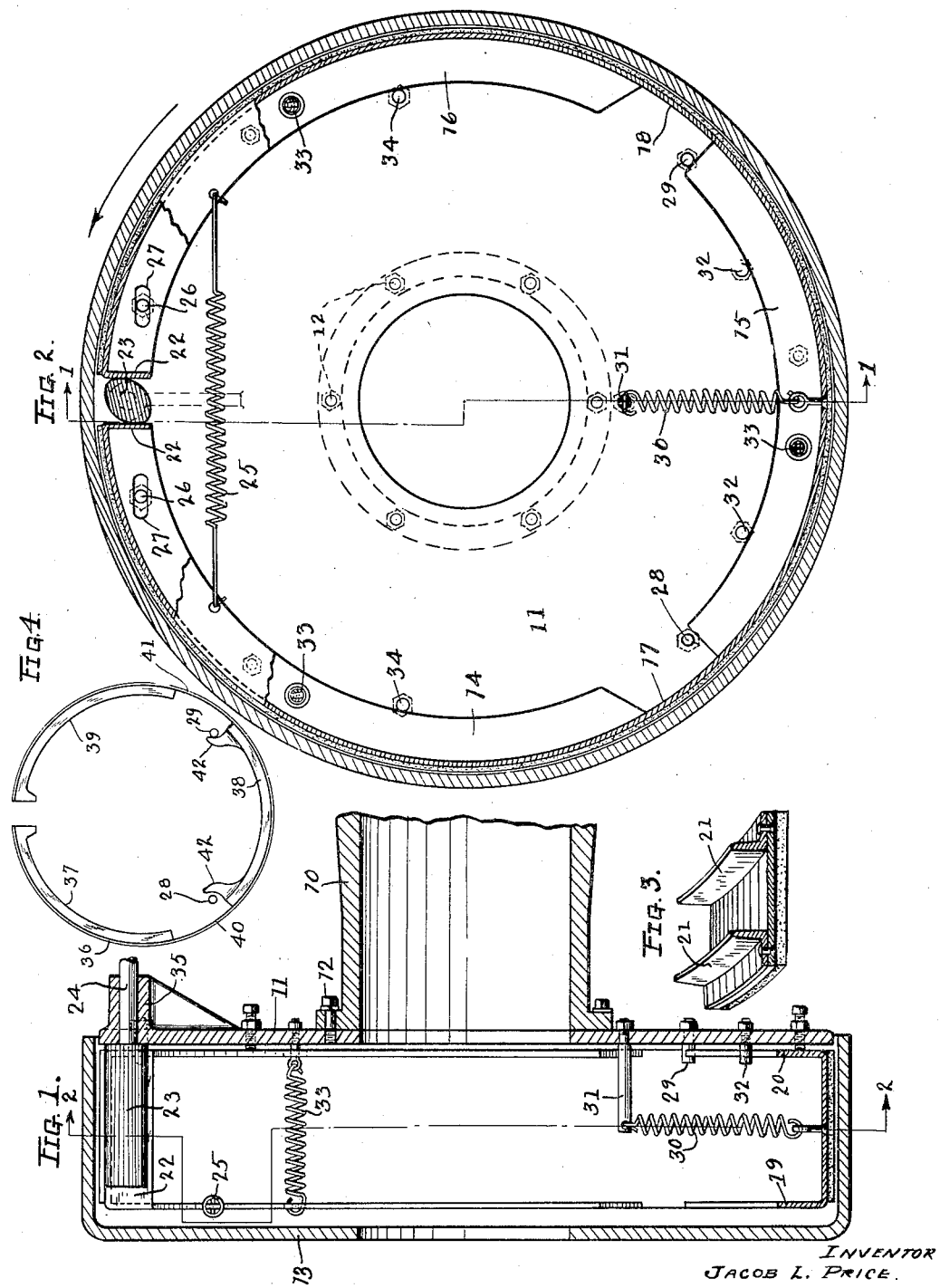
INVENTOR
JACOB L. PRICE.
BY Kivis Hudson + Kent
ATTORNEYS.

Patented Sept. 2, 1930

1,774,565

UNITED STATES PATENT OFFICE

JACOB L. PRICE, OF SOUTH BEND, INDIANA, ASSIGNOR, BY MESNE ASSIGNMENTS, TO BENDIX BRAKE COMPANY, OF SOUTH BEND, INDIANA, A CORPORATION OF ILLINOIS

BRAKE

Application filed March 3, 1926. Serial No. 91,896.

This invention relates to brakes and more especially to brakes for use on motor vehicles.

It is one of the objects of the invention to provide an internally expanding brake that will be very inexpensive to manufacture and, nevertheless, efficient in operation.

A further object of the invention is to provide an internally expanding brake that functions essentially as an expanding band and which is, nevertheless, so restricted in its self-applying effect as to be smooth in action and avoid all tendency to "grab".

A further object of the invention is to provide a brake of the type referred to that will be equally effective for either direction of rotation of the brake drum.

Other objects of the invention and the features of novelty will be apparent from the following description taken in connection with the accompanying drawings, of which:

Fig. 1 is an axial section through a brake mechanism embodying my invention, the section being taken on the line 1—1 of Fig. 2.

Fig. 2 is a section of the same on the line 2—2 of Fig. 1.

Fig. 3 is a perspective view of a fragment of a different form of reinforcement for the brake band.

Fig. 4 is a diagrammatic view of another form of brake embodying my invention.

Referring to the drawings, 10 indicates the end of an axle housing on which there is secured the spider or dust cover 11 for the brake mechanism, the spider 11 being secured to the housing 10 in any suitable manner, as by means of bolts 12. A brake drum, of ordinary form, is indicated at 13 and it will be understood that this drum is carried by the vehicle wheel so as to rotate therewith.

Within the drum 13 there is an internally expanding brake band which comprises the relatively stiff sections 14, 15 and 16 which are integrally connected together by the radially flexible portions 17 and 18. The sections 14, 15 and 16 may be made relatively stiff by means of the integral radially extending side flanges 19 and 20, as shown in Figs. 1 and 2, or by the reinforcing angles 21, as shown in Fig. 3, these angles being riveted or otherwise secured to the band. The ends of the band are turned inward as indicated at 22 and properly secured to the reinforcing flanges so as to provide surfaces with which an actuating cam 23 cooperates. The cam 23 is carried by a shaft 24 which is supported in the spider 11, according to the usual practice. A spring 25 connects the sections 14 and 16 and normally holds the ends of the band against the cam 23, when the brake is released, this spring also serving to withdraw the sections 14 and 16 from the drum. The ends of the band are guided in their movements toward and away form the drum by means of the pins 26 which engage slots 27, in the reinforcing flanges, the pins 26 being carried by the spider 11.

As will be seen from Fig. 2, adjustable eccentric stops 28 and 29 are provided adjacent the ends of the section 15, these stops serving to limit the extent of rotation of the band, with the drum, when the brake is applied. A spring 30 has its upper end secured to an anchor pin 31 on the spider 11 and its lower end connected with the section 15 and serves ta draw this section of the brake radially inward when it is released, such movement being limited by the pins 32 and the adjustable stops 28 and 29. The usual springs 33 are provided for the purpose of drawing the brake toward the spider 11 to prevent rattling when the brake is disengaged from the drum.

Pins 34 are also provided on the spider 11 for the purpose of limiting the inward movement of the sections 14 and 16.

The stop pins 28 and 29 are located radially inward from the periphery of the brake so that when the brake is applied the section 15 will fulcrum on one or the other of these pins, depending on the direction of rotation of the drum. As shown in Fig. 2 one of the reinforcing flanges of the section 15 is in engagement with the pin 29 and, assuming that the drum is rotating in the direction of the arrow, the rotation of the cam 23 will move the section 14 into engagement with the drum. This will cause the section 14 to tend to travel with the drum and thus swing the section 15, about the pin 29, into engagement with the drum. In this way the sections 14 and 15 have a certain amount of self-applying action which is restricted to these sections on account of the engagement of the section 15 with the pin 29. However, the cam 23 will press the section 16 against the drum, although this section will have no self-applying action. The flexible connections 17 and 18, between the relatively stiff sections of the brake, permit the sections to operate as brake units, at the same time providing connections between the sections which are extremely simple and inexpensive and avoid the use of joints and pivot pins which are commonly used for connecting brake units.

The sections 14, 15 and 16, as well as the pins 28 and 29, are symmetrically arranged with respect to the cam 23 so that the brake will be equally effective in operation regardless of the direction of rotation of the drum. When the rotation is opposite to the arrow in Fig. 2, the pin 28 will function as the fulcrum point for the brake section 15. When the brake is released the spring 30 withdraws the section 15 into contact with both stops 28 and 29 is well as pins 32, the flexibility of the sections 17 and 18 permitting this.

While I have shown an ordinary bearing 35, in the spider 11 for the shaft 24, it is contemplated that any of the usual types of flexible mountings for this shaft may be provided for the purpose of permitting the cam 23 to float between the ends of the brake in accordance with the circumferential movements of the brake when applied to the drum. I may, for example, employ the mounting disclosed and fully described in Patent No. 1,656,939 granted Bendix Brake Company January 24, 1928, on application of Vincent Bendix.

In the form of the invention shown in Fig. 4, the flexible band 36 has secured to its interior, by riveting or otherwise, the three reinforcing members 37, 38 and 39, the members 37 and 39 being so spaced from the member 38 as to leave the flexible portions 40 and 41 which are similar, in function, to the sections 17 and 18 of Fig. 1. At the ends of the section 38 there are lugs 42 which are adapted to engage with the stops 28 and 29 for the purpose previously described. This form of construction functions the same as the construction shown in Fig. 1 and while I have not shown the retracting springs 25 and 30, in Fig. 4, it is to be understood these have been omitted for the sake of clearness and because of the relatively reduced character of Fig. 4.

Having thus described my invention, what I claim is:—

1. In brakes, a flexible band having radially extending reinforcing flanges which are spaced apart at a plurality of points in the circumference of the band to provide a plurality of relatively stiff sections that are flexibly connected by the portions of the band at said points.

2. In brakes, a flexible band having integral radially extending reinforcing flanges which are cut away at a plurality of points in the circumference of the band to provide a plurality of relatively stiff sections that are flexibly and integrally connected by the portions of the band at said points.

3. A brake structure comprising a flexible band having an interrupted radially extending flange portion providing a plurality of flexibly connected relatively stiff sections.

In testimony whereof, I hereunto affix my signature.

JACOB L. PRICE.